US012791685B2

(12) United States Patent
Katou

(10) Patent No.: US 12,791,685 B2
(45) Date of Patent: Nov. 10, 2026

(54) ATTITUDE/POSITION DETECTION SYSTEM AND METHOD FOR DETECTING ATTITUDE/POSITION OF DETECTOR

(71) Applicant: DENSO CORPORATION, Kariya-city (JP)

(72) Inventor: Kazuki Katou, Kariya-city (JP)

(73) Assignee: DENSO CORPORATION, Kariya-city (JP)

(*) Notice: Subject to any disclaimer, the term of this patent is extended or adjusted under 35 U.S.C. 154(b) by 1103 days.

(21) Appl. No.: 17/811,453

(22) Filed: Jul. 8, 2022

(65) Prior Publication Data

US 2022/0342055 A1 Oct. 27, 2022

Related U.S. Application Data

(63) Continuation of application No. PCT/JP2020/047165, filed on Dec. 17, 2020.

(30) Foreign Application Priority Data

Jan. 10, 2020 (JP) ................................ 2020-002523

(51) Int. Cl.

*G01S 7/497* (2006.01)
*G01S 7/40* (2006.01)
*G01S 13/87* (2006.01)
*G01S 17/06* (2006.01)
*G01S 17/86* (2020.01)

(52) U.S. Cl.

CPC ............ *G01S 7/497* (2013.01); *G01S 7/4086* (2021.05); *G01S 13/874* (2013.01); *G01S 17/06* (2013.01); *G01S 17/86* (2020.01)

(58) Field of Classification Search

CPC .......... G01S 7/497; G01S 17/06; G01S 17/86; G01S 7/4086; G01S 2013/93273; G01S 7/4972; G01S 17/931; G01S 7/4026; G01S 13/874; G01S 13/878; G01S 13/931

See application file for complete search history.

(56) References Cited

U.S. PATENT DOCUMENTS

| | | | | |
|---|---|---|---|---|
| 11,959,774 | B1 * | 4/2024 | Zhao ......................... | G06T 7/80 |
| 2017/0343654 | A1 | 11/2017 | Valois et al. | |
| 2018/0292526 | A1 * | 10/2018 | Papadelis .............. | G01S 7/4808 |
| 2019/0204427 | A1 | 7/2019 | Abari et al. | |
| 2020/0096604 | A1 | 3/2020 | Okubo et al. | |

FOREIGN PATENT DOCUMENTS

| | | | |
|---|---|---|---|
| JP | 2005-331353 | A | 12/2005 |
| JP | 2010-185757 | A | 8/2010 |
| JP | 2017-009574 | A | 1/2017 |
| JP | 2017-026551 | A | 2/2017 |

* cited by examiner

*Primary Examiner* — Isam A Alsomiri
*Assistant Examiner* — Joseph C Fritchman
(74) *Attorney, Agent, or Firm* — Precision Patents, P.C.

(57) ABSTRACT

In an attitude/position detection system for detecting an attitude/position of at least one detector mounted to a vehicle, at least one target is used to detect the attitude/position of the at least one detector. A change mechanism is configured to change a position of the vehicle relative to the at least one target. An attitude/position detection device is configured to control the change mechanism to maintain the position of the vehicle relative to the at least one target for a predefined period of time, and detect the attitude/position of the at least one detector using a result of detection of the at least one target by the at least one detector.

14 Claims, 10 Drawing Sheets

ATTITUDE/POSITION DETECTION SYSTEM AND METHOD FOR DETECTING ATTITUDE/POSITION OF DETECTOR

CROSS-REFERENCE TO RELATED APPLICATION

This application is a continuation application of International Application No. PCT/JP2020/047165 filed Dec. 17, 2020 which designated the U.S. and claims priority to Japanese Patent Application No. 2020-002523 filed Jan. 10, 2020, the contents of each of which are incorporated herein by reference.

BACKGROUND

Technical Field

This disclosure relates to a technique for detecting an attitude and a position of a detector used on-board a vehicle.

Related Art

A technique has been proposed for calibrating a detector on-board a vehicle to acquire proper detection results from the on-board detector.

DESCRIPTION OF SPECIFIC EMBODIMENTS

Figure 1:
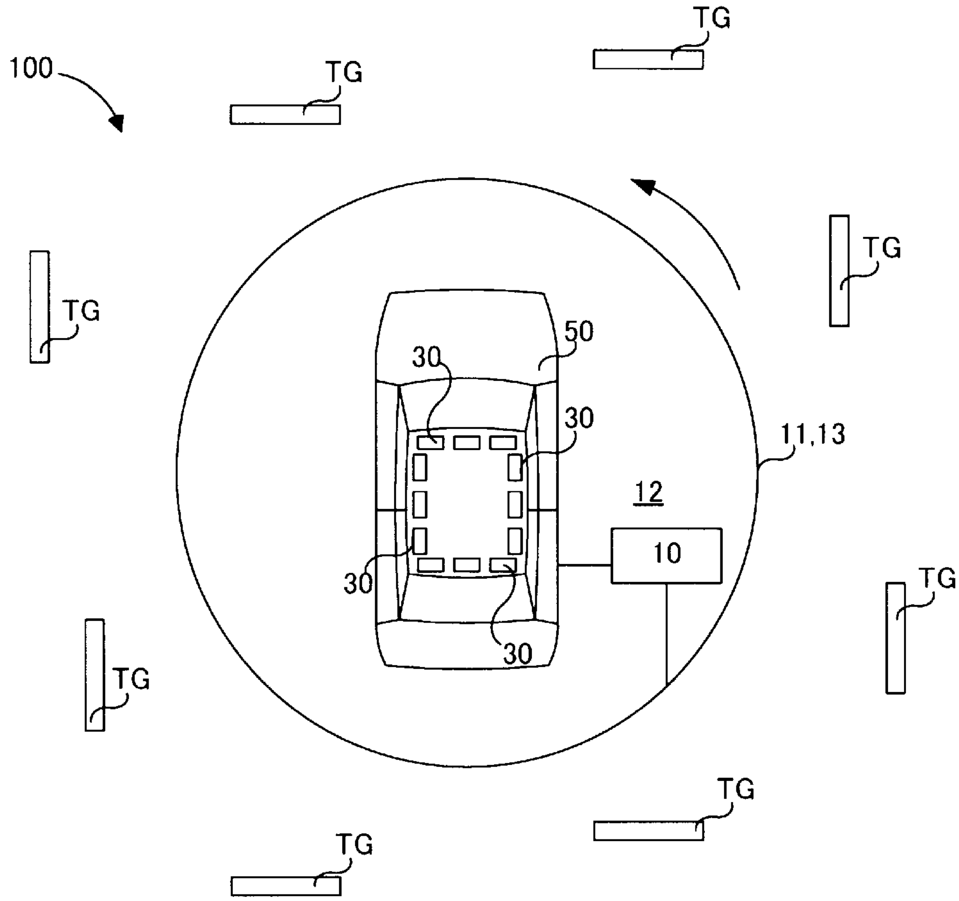
FIG. 1 is a schematic diagram of a detector attitude/position detection system according to a first embodiment.

In recent years, the number and variety of detectors mounted to vehicles are growing to implement driver assistance and autonomous driving. However, with the above technique, as disclosed in JP 2017-26551 A, there is an issue that attitude/position detection and calibration of multiple detectors are time-consuming. There is another issue that attitude/position detection and calibration suitable for each of the types of detectors is cumbersome.

In view of the foregoing, it is desired to have a technique for efficiently detecting at least one of an attitude and a position of each of a plurality of detector mounted to a vehicle.

A first aspect provides an attitude/position detection system for detecting an attitude/position of at least one detector mounted to a vehicle. The attitude/position detection system according to the first aspect includes at least one target used to detect the attitude/position of the at least one detector; a change mechanism configured to change a position of the vehicle relative to the at least one target; and an attitude/position detection device configured to control the change mechanism to maintain the position of the vehicle relative to the at least one target for a predefined period of time, and detect the attitude/position of the at least one detector using a result of detection of the at least one target by the at least one detector.

In accordance with the attitude/position detection system according to the first aspect, the attitude/position of each of a plurality of detectors mounted to the vehicle can be efficiently detected.

A second aspect provides an attitude/position detection method for detecting an attitude/position of at least one detector, where the at least one detector is mounted to a vehicle. The attitude/position detection method according to the second aspect includes: changing a position of at least one target used to detect the attitude/position of the at least one detector, relative to the vehicle; maintaining the position of the at least one target relative to the vehicle for a predefined period of time; and detecting the attitude/position of the at least one detector using a result of detection of the at least one target by the at least one detector.

In accordance with the attitude/position detection method according to the second aspect, the attitude/position of each of a plurality of detectors mounted to the vehicle can be efficiently detected.

A third aspect provides an attitude/position detection system for detecting an attitude/position of at least one detector, where the at least one detector is mounted to a vehicle. The attitude/position detection system according to the third aspect includes: at least one target used to detect the attitude/position of the at least one detector; a position determination device configured to detect a position of the at least one target relative to the vehicle; and an attitude/position detection device configured to detect the attitude/position of the at least one detector using position information acquired from the position determination device.

In accordance with the attitude/position detection system according to the third aspect, the attitude/position of each of a plurality of detectors mounted to the vehicle can be efficiently detected.

A fourth aspect provides an attitude/position detection method for detecting an attitude/position of at least one detector, where the at least one detector is mounted to a vehicle vehicle. The attitude/position detection method according to the fourth aspect includes: detecting a position of the vehicle relative to at least one of a plurality of targets used to detect the attitude/position of the at least one detector; and detecting the attitude/position of the at least one detector using detected position information.

In accordance with the attitude/position detection method according to the fourth aspect, the attitude/position of each of a plurality of detectors mounted to the vehicle can be efficiently detected. The present disclosure may also be implemented as a program for detector attitude/position detection or as a computer-readable storage medium storing said program.

Hereinafter, an attitude/position detection system and an attitude/position detection method for detecting attitudes/positions of on-board measuring devices according to the present disclosure will now be described based on some exemplary embodiments.

First Embodiment

As illustrated in FIG. 1, an attitude/position detection system 100 of a first embodiment includes at least a plurality of targets TG, an attitude/position detection device 10, a change mechanism 12. The plurality of targets TG are physical targets used to detect at least one of an attitude and a position of each of a plurality of detectors 30 mounted to a vehicle 50, and are disposed around the change mechanism 12. In this specification, the "attitude/position" means at least one of an attitude and a position. The plurality of targets are prepared according to the type of detection scheme used by the detectors 30, such as cameras, light detection and ranging/laser imaging detection and ranging (Lidar), or millimeter wave radars. The change mechanism 12 is a rotating mechanism for changing the position of the vehicle 50 relative to the targets TG, that is, a vehicle rotating device. In the example illustrated in FIG. 1, a turntable having a rotatable stage for having the vehicle 50 placed thereon is used as the change mechanism 12. The attitude/position detection device 10 controls a change-mechanism actuator 11 that rotates the turntable 12, such as an electric motor, to rotate the vehicle 50 on the turntable 12 by a predefined unit angle and then stop rotation of the turntable for a predefined time, and repeatedly perform this routine. An angle of rotation of the turntable 12, that is, a rotational position, may be detected by a position sensor 13 that detects the angle of rotation of the turntable, and may be input to the attitude/position detection device 10. The attitude/position detection device 10 may be a mounted type device that is disposed on or around the turntable 12, or a portable type device. Communications between the attitude/position detection device 10 and the change mechanism actuator 11 may be provided by cable-wired communications, or by various wireless communications, such as wireless LAN or Bluetooth™.

Figure 2:
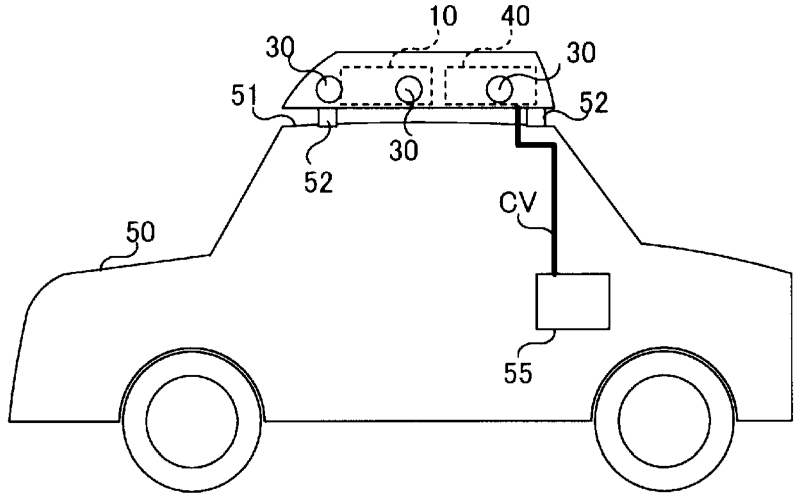
FIG. 2 is an illustration of an example of a vehicle equipped with detectors.

As illustrated in FIG. 2, the vehicle 50 has a plurality of detectors 30 mounted on a roof 51 via a fixing mechanism 52 and a data processing unit 40 connected to the detectors 30. The detectors 30 may be provided, for example, on a front grille, a front window, a front bumper, a rear window, a rear bumper, a front fender, or a rear fender of the vehicle 50, or may be provided on any one of them. The data processing unit 40 may be connected to a vehicle control unit 55 via a cable CV inside the vehicle 50. The data processing unit 40 integrates detection data received from the plurality of detectors 30 to generate integrated data and transmits the integrated data to the vehicle control device 55 inside the vehicle 50. The vehicle control unit 55 is configured to perform driving assistance or autonomous driving, and control, via various actuators (not shown), output power of an internal combustion engine or a motor in response to or irrespective of driver's operations of an accelerator pedal, and enable braking by a braking device irrespective of driver's operations of a brake pedal, or enable steering by a steering device irrespective of driver's operations of a steering wheel. The data processing unit 40 may include, as part of its function, an attitude/position detection function similar to that provided by the attitude/position detection device 10, or the vehicle 50 may be equipped with the attitude/position detection device 10.

Figure 3:
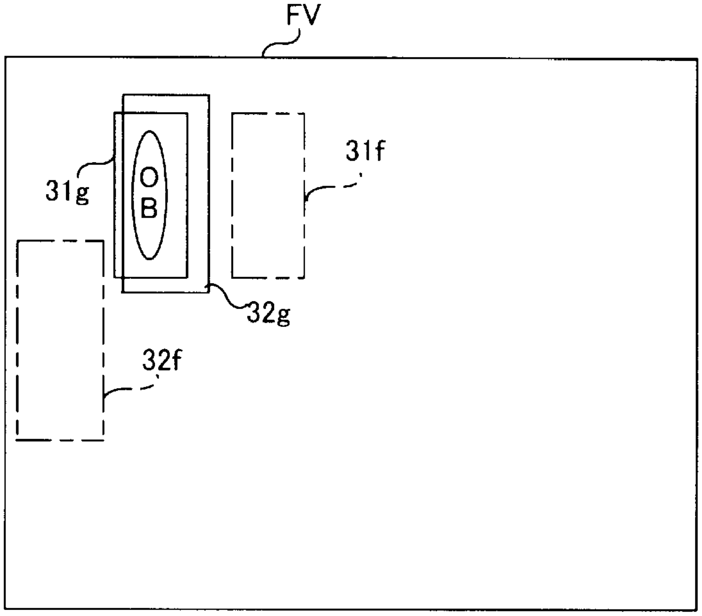
FIG. 3 is an illustration of a result of detection of an object by a plurality of detectors.

Referring to FIG. 3, results of detection of an object by the respective detectors 30 and deviation of these detection results will be described. In the present embodiment, the detectors 30 are mounted to the vehicle 50 such that a detection region of each detector 30 overlaps a detection range of its adjacent or nearby detector 30. As schematically illustrated in FIG. 3, detected positions 31*f*, 31*g*, 32*f*, 32*g* of the object by the first and second detectors 30 as example adjacent detects are superimposed in the forward field of view FV of the vehicle 50. When each of first and second detectors is mounted to the vehicle 50 in a predefined attitude/position relative to the vehicle 50, that is, in a predefined vertical or horizontal orientation or position, the position of the object OB and the detected positions 31*g*, 32*g* overlap. On the other hand, when neither the first nor second detector is mounted to the vehicle 50 in a predefined attitude/position relative to the vehicle 50, then the position of the object OB and the detected positions 31*f*, 32*f* by the first and second detectors do not overlap. In cases where the attitude/position of either the first or second detector is different from the predefined attitude/position, the detected position 31*g* is acquired from the first detector while the detected position 32*f* is acquired from the second detector. Thus, a deviation occurs between the detected positions acquired from the first and second detectors. Such a deviation of detected positions leads to misrecognition of the position of the object OB relative to the vehicle 50. This leads to a decrease in the accuracy of performance of driving assistance and autonomous driving targeting the object OB. Thus, when the vehicle 50 goes off line or when repairs are performed on the vehicle 50 that involve removal and installation of some or all of the detectors 30, or during pre-service inspection of the vehicle 50, the attitude/position of each detector 30 relative to the vehicle 50 is detected. It is preferable to perform physical attitude/position adjustment using the detected attitude/position of each detector 30 or to perform calibration or aiming to correct the detection data output from the detectors 30 by using a difference between the detected attitude/position and the predefined attitude/position as a correction value. However, as illustrated in FIG. 2, the vehicle 50 is equipped with a large number of detectors 30, and thus it takes time to detect the attitude/position of each detector 30. In the present embodiment, the time required for attitude/position detection of the detectors 30 is reduced and the accuracy of attitude/position detection is improved by performing appropriate attitude/position detection for the detectors 30 of different types of detection schemes.

Figure 4:
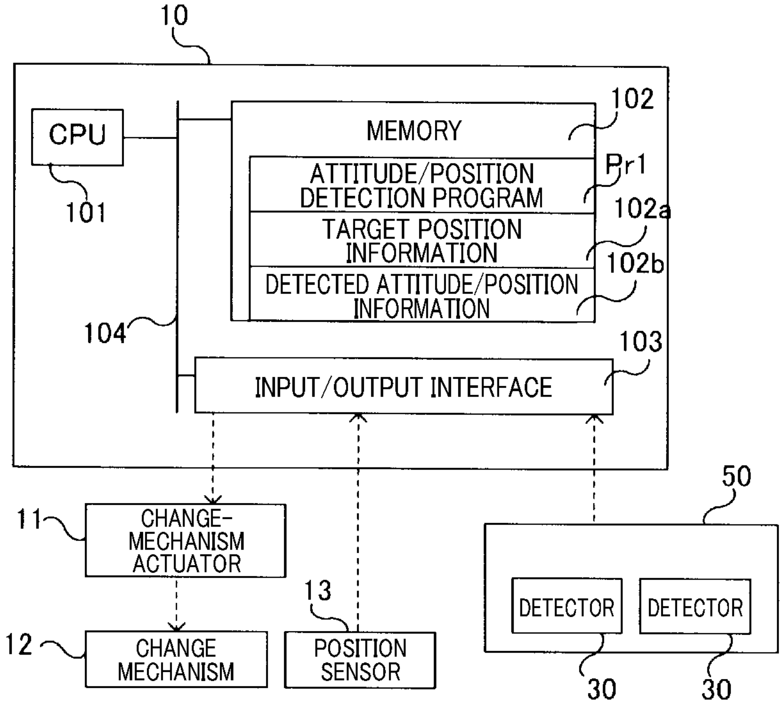
FIG. 4 is a functional block diagram of an attitude/position detection device of the first embodiment.

As illustrated in FIG. 4, the attitude/position detection device 10 includes a central processing unit (CPU) 101 as a calculation unit, a memory 102 as a storage unit, an input/output interface 103 as an input/output unit, and a clock generator (not shown). The CPU 101, the memory 102, the input/output interface 103, and the clock generator are bidirectionally communicatively connected via an internal bus 104. The memory 102 includes a non-volatile read-only memory storing an attitude/position detection processing program Pr1 for performing an attitude/position detection process, such as the ROM, and a memory that can be read/written by the CPU 101, such as the RAM. The attitude/position detection processing program Pr1 includes not only a program for detecting an attitude/position of each detector 30 using detection data from the detector 30, but also a program for performing a change-mechanism control process to control movement of the change mechanism. The non-volatile, read-only area of the memory 102 includes a target position information storage area 102*a* that stores target position information indicating a position of each target relative to the vehicle 50 when the vehicle 50 is placed in a reference position, and a detected attitude/position information storage area 102*b* that stores detected attitude/position information of each detector 30. The non-volatile, read-only area may be rewritable when updating the program or recording detected attitudes/positions. The target position information may be the three-dimensional coordinate information of each target using the center of gravity of the vehicle 50 as a reference point, or may be three-dimensional coordinate information of each target predetermined using each detector 30 or each reference detector 30*s* mounted to the vehicle 50. When the target position information is information with the center of gravity of the vehicle 50 as a reference point, each detector 30 is disposed far from the center of gravity of the vehicle 50. Therefore, it is desirable that the coordinate position of each target be corrected using a difference between the mounted position of each detector 30 and the center of gravity of the vehicle 50 so as to improve the attitude detection accuracy. The target position information may be prepared for each rough vehicle type, such as a sedan or a sport utility vehicle (SUV), or may be prepared for each type of the vehicle 50. The CPU 101, that is, the attitude/position detection device 10, functions as an attitude/position detection device and a change mechanism control device by deploying and performing the attitude/position detection processing program Pr1 stored in the memory 102. The CPU 101 may be a single CPU, multiple CPUs executing respective programs, or a multitasking or multi-threaded CPU capable of executing multiple programs simultaneously.

In addition to the interface function for transmitting control signals to the change-mechanism actuator and receiving change-mechanism position information from the position sensor 13, the input/output interface 103 has a vehicle interface function for transmitting and receiving with the vehicle 50. The interface function includes both a hardware interface function, such as connector terminal shapes, and a software interface function, such as communication protocol conversion. Detection data detected by detectors 30 are input to the input/output interface 103 via an external interface of the vehicle 50.

Figure 5:
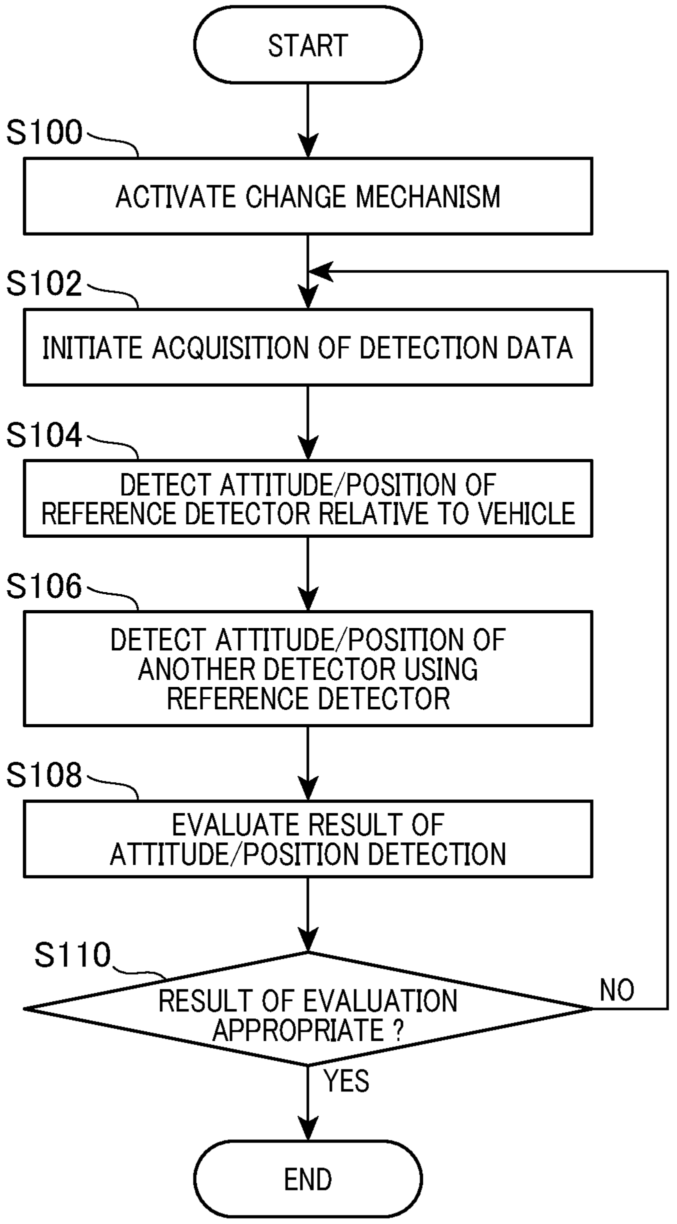
FIG. 5 is a flowchart illustrating a process flow of an attitude/position detection process performed by the attitude/position detection device of the first embodiment.
Figure 6:
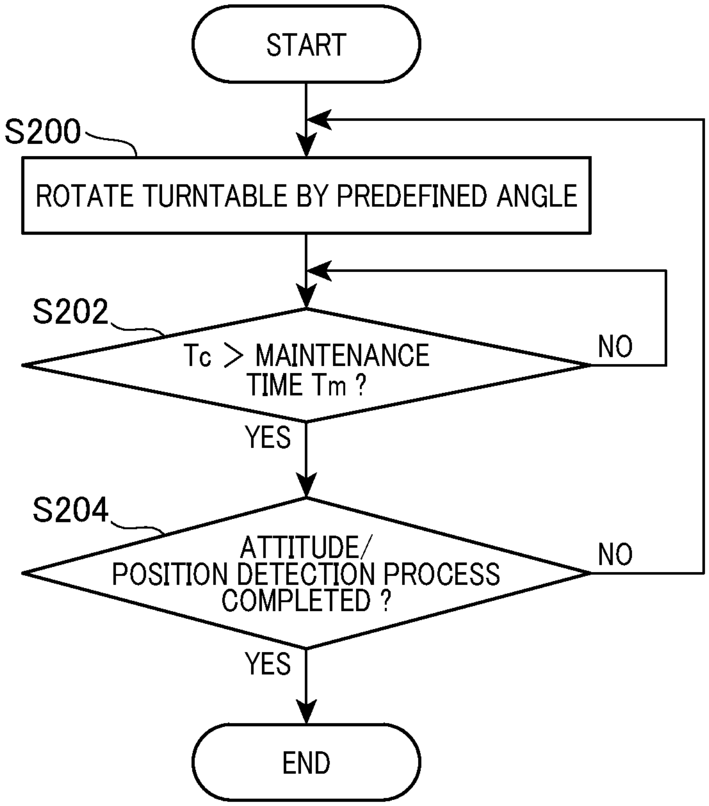
FIG. 6 is a flowchart illustrating a process flow of a change mechanism control process performed by the attitude/position detection device of the first embodiment.
Figure 7:
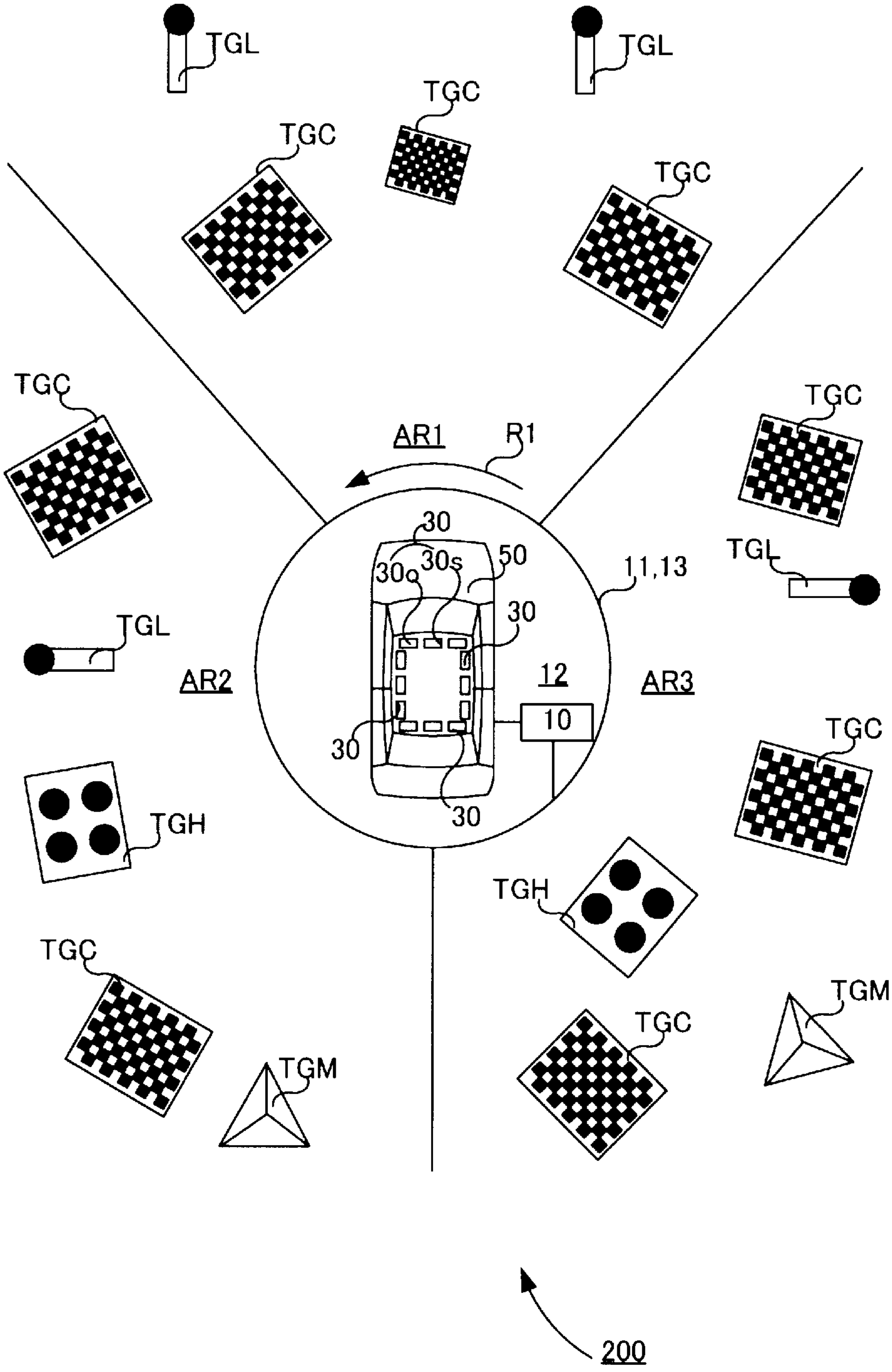
FIG. 7 is a schematic illustration of an example of an attitude/position detection booth.

A detector attitude/position detection process performed by the detector attitude/position detection system 100 will now be described with reference to FIGS. 5 and 6. Each of the process flows illustrated in FIGS. 5 and 6 are performed by the attitude/position detection device 10, that is, the CPU 101, executing the attitude/position detection program Pr1. The process flow illustrated in FIG. 5 may be initiated automatically or manually, for example, in response to an external sensor detecting that the vehicle 50 is stopped at a predefined reference position in the attitude/position detection booth 200 equipped with the attitude/position detection system 100. In the present embodiment, the attitude/position detection booth 200 having the layout configuration illustrated in FIG. 7 is used. The attitude/position detection booth 200 includes a plurality of target zones, for example, three target zones AR1 to AR3. In the attitude/position detection process of the present embodiment, during a 360-degree rotation of the vehicle 50 in the direction of the arrow R1, the detectors 30 mounted to the vehicle 50 will face the targets TG disposed in a first area AR1, the targets TG disposed in a second area AR2, and the targets TG disposed in a third area AR3, in this order of these three areas AR1-AR3. The first area AR1 is provided for detecting the attitude/position of each reference detector 30*s* relative to the vehicle 50. In the first area AR1, a plurality of first targets are provided for detecting the attitude/position of each reference detector 30*s* relative to the vehicle 50. The second area AR2 is provided for detecting an attitude/position of each of other detectors 30*o* using the detection result from each reference detector 30*s*. In the second area AR2, a plurality of second targets are disposed for detecting the attitude/position of each of other detectors 30*o* using the detection result from each reference detector 30*s*. The third area AR3 is provided for evaluating the detected attitude/position of each of the plurality of detectors. In the third area AR3, a plurality of third targets are disposed for evaluating the detected attitude/position of each of the plurality of detectors. In the present embodiment, at least target position information for each target disposed in the first area AR1 may be stored in the memory 102. The first targets include targets TGC for the cameras and targets TGL for the Lidar. The second targets include targets TGC for the cameras, a target TGL for the Lidar, a target TGM for the millimeter wave radar, and a target for the cameras and Lidar. The targets TGC, TGM, TGL, and TGH may have different shapes and characteristics depending on the respective areas AR1-AR3, or may have the same shape and characteristics between the first to third areas AR1-AR3. Preferably, the targets TGC for the cameras have a black and white pattern to detect edges as feature points. Preferably, the targets TGL for the Lidar may include reflectors. Preferably, the targets TGM for the millimeter wave radar may be triangular-pyramid shaped and formed of a hard material such as, for example, metal.

The attitude/position detection device 10, that is, the CPU 101, activates the change mechanism 12 (at step S100). Specifically, upon initiation of the processing routine illustrated in FIG. 5, the CPU 101 initiates the processing routine illustrated in FIG. 6 to initiate rotation control of the turntable 12. The CPU 101 controls the change-mechanism actuator 11 to rotate the turntable 12 by a predefined angle (at step S200). The predefined angle is determined by the required attitude/position detection accuracy for each detector 30. The smaller the predefined angle, the higher the accuracy of attitude/position detection. However, it takes longer time to perform the attitude/position detection process. To improve the efficiency of the attitude/position detection process, the predefined angle is, for example, 5 to 20 degrees, preferably, 10 degrees. The CPU 101 waits until the elapsed time tc (s) after rotating the turntable 12 by the predefined angle reaches a maintenance time tm (s) ("NO" branch of step S202). Thus, the turntable 12 is stopped at the predefined angle. Preferably, the maintenance time tm is determined depending on the detection scheme used in the detectors 30 subjected to attitude/position detection. The maintenance time tm may be 4 seconds (s) for the cameras, 10 seconds for the Lidar, and 5 seconds for the millimeter wave radar. In cases where the Lidar is disposed in front of, behind, to the left of, and to the right of the vehicle 50, respectively, the maintenance time tm may be set to 10 seconds as a result of use of the suitable maintenance tm. The minimum maintenance time tm is one second. The longer the maintenance time tm is, the more the detection data can be averaged, which can increase the accuracy of attitude/position detection. When the maintenance time tm elapses, that is, when it is determined that tc>tm ("YES" branch of step S202), the CPU 101 determines whether the attitude/position detection process has been completed (at step S204). The end of the attitude/position detection process may be determined, for example, by detecting that the rotation angle of the turntable 12 has reached 360 degrees, or in response to the result of determination in the process flow illustrated in FIG. 5 that the attitude/position detection process has been performed with the desired accuracy or evaluation. If the CPU 101 determines that the attitude/position detection process has not been completed ("NO" branch of step S204), the CPU 101 proceeds to step S200 and repeats steps S202 and S204. If the CPU 101 determines that the attitude/position detection process has been completed ("YES" branch of step S204), the CPU 101 ends this processing routine. Before activating the change mechanism 12, the CPU 101 may, in the process flow illustrated in FIG. 5, determine the position of each target TG relative to the vehicle 50, that is, the attitude/position of the vehicle 50. In the present embodiment, the attitude/position of each detector 30 is determined under assumption that the vehicle 50 is stopped at the reference position, that is, the vehicle 50 is facing the targets TG that are reference targets for determining the vehicle attitude/position. Alternatively, the position of each target TG relative to the vehicle 50 may be dynamically determined as described later in the second embodiment.

Upon initiating control of rotation of the turntable 12, the CPU 101 initiates acquisition of detection data output from the detectors (at step S102). Specifically, the CPU 101 sequentially acquires detection data output from the detectors 30 during a period of time in which the predefined angle of the turntable 12 is maintained, that is, at the timing when the turntable 12 is stationary. The vehicle 50 is equipped with a plurality of detectors 30, and the CPU 101 acquires detection data from each of the plurality of detectors 30. The CPU 101, for example, temporarily stores the acquired detection data in the memory 102 in association with the rotation angle of the turntable 12.

Using the detection data acquired from any one of reference detectors **30*s* among the detectors 30, the CPU 101 detects an attitude/position of the reference detector 30*s* relative to the vehicle 50 (at step S104). The reference detectors 30*s* may include, for example, a Lidar or a camera disposed in each of the front, rear, left, and right directions of the vehicle 50, and may, preferably, further include a Lidar or a camera disposed in the lateral center or longitudinal center of the vehicle 50. When detecting the attitude/position of the reference detector 30*s*, camera-lens distortion calculation may be performed. The attitude/position of the reference detector 30*s* relative to the vehicle 50 is determined using the detection data acquired at the rotation angle where a detection region of the reference detector 30*s* is the first region AR1. The CPU 101 extracts one or more feature points of each target TG from the detection data, determines a detection coordinate position of each target TG determined by the feature points, and compare it with the stored coordinate position of each target TG in the memory 102. The coordinate position is represented by the three-dimensional coordinates (x, y, z). Using a deviation of the detected coordinate position from the stored coordinate position, the current attitude/position of the reference detector 30*s* relative to the predefined attitude/position of the reference detector 30*s* may be detected as an amount of coordinate position deviation. Extraction of the feature points is achieved by extracting corner points of a target from a group of detection points acquired by Lidar as a detector, or by extracting pixels of corners of a target from an image captured by a camera as a detector. For example, the Harris corner detection method is known. The detected coordinate position of each target TG determined by the feature points may be compared with the stored coordinate position for each feature point when there are multiple feature points, or the detected coordinate position may be compared with the stored coordinate position for the average coordinate position of multiple feature points. Alternatively, multiple feature points may be associated to each other, where the equation $X'=RX+T$ may be applied to four or more associated points to calculate the attitude R and the position T. The attitude R is represented by a 3×3 matrix and the position T is represented by a 3×1 matrix. The association is implemented, for example, using the known nearest neighbor method or the Global Nearest Neighbor method. Detection of the attitude/position of the reference detector 30*s* relative to the vehicle 50 corresponds to a process of matching the local coordinates of the reference detector 30*s* with the world coordinates of the external environment, using the targets in the external environment in which the vehicle resides. The detected attitude/position information of the reference detector 30*s* is stored in the attitude/position information storage area 102*b***.

Upon detecting the attitude/position of the reference detector **30*s* relative to the vehicle 50, the CPU 101 uses the reference detector 30*s* to detect the attitude/position of another detector 30*o* (at step S106). The detected attitude/position information of the other detector 30*o* is stored in the detection attitude/position information storage area 102*b*. In the present embodiment, as previously described, each detector 30 is mounted to the vehicle 50 such that at least part of its detection region of the detector 30 overlaps with the detection region of another detector 30. More specifically, the detection region of the reference detector 30*s* at least partially overlap the detection region of another detector 30*o*. Thus, the attitude/position of another detector 30*o* is detected using the detected attitude/position of the reference detector 30*s*. That is, using a deviation of position information of the target acquired from another detector 30*o* from position information of the target acquired from the reference detector 30*s*, the attitude/position of another detector 30*o* relative to the attitude/position of the reference detector 30*s* can be detected as an amount of deviation in coordinate position, that is, a difference in orientation and position. The attitude/position of another detector 30*o* using the reference detector 30*s* is determined using the detection data acquired from the reference detector 30*s* and the other detector 30*o* at the rotation angle where the reference detector 30*s* and the other detector 30*o* have the second region AR2 as their detection region. Detection of the attitude/position of another detector 30*o* using the reference detector 30*s* is implemented by the detection scheme using the previously described feature points. That is, any one of the previously described detection schemes may be performed using the feature points corresponding to the reference detector 30*s* and the feature points corresponding to another detector 30*o***.

Upon detecting the attitude/position of another detector **30*o* using the reference detector 30*s*, the CPU 101 evaluates the attitude/position detection result (at step S108). The evaluation of the attitude/position detection result is determined using the detection data acquired from the reference detector 30***s* and the other detector 30*o* at the rotation angle where the reference detector 30*s* and the other detector 30*o* have the third region AR3 as their detection region. Evaluation of the attitude/position detection result is performed in a similar manner to detection of the attitude/position of the other detector 30*o* using the reference detector 30*s*. For each detector 30, evaluation is performed according to whether a difference between the attitude/position detection result acquired at step S106 and stored in the attitude/position information memory 102*b* and the attitude/position detection result acquired at step S108 is zero or within a predefined range. More specifically, it is determinized whether a difference between an amount of deviation between the coordinate position of the target detected by the reference detector 30*s* and the coordinate position of the target detected by the other detector 300, acquired for the second and third regions, is zero or within a predetermined range. If the CPU 101 determines that the difference between the attitude/position detection result acquired at step S106 and the attitude/position detection results acquired at step S108 is zero or within the predetermined range, the CPU 101 determines that the evaluation result is appropriate ("YES" of step S110), and then ends this processing routine. Upon completion of this processing routine, the CPU 101, at step S204 illustrated in FIG. 6, determines that the attitude/position detection is completed. If the CPU 101 determines that the difference between the attitude/position detection result acquired at step S106 and the attitude/position detection result acquired at step S108 is neither zero nor within the predetermined range, the CPU 101 determines that the evaluation result is not appropriate ("NO" of step S110), then proceeds to step S102 and performs again steps S102 to S108.

According to the detector attitude/position detection system 100 of the first embodiment described above, the change mechanism 12 changes the position of the vehicle 50 relative to the targets TG and maintains the position of the vehicle 50 relative to the targets TG for a predefined period of time, and thereby detect the attitude/position of a detector 30 by using a detection result of another detector 30 relative to the targets TG, which enables efficient detection of the attitude/position of each of the plurality of detectors 30 mounted to the vehicle 50. More specifically, the detector attitude/position detection system 100 in the present embodiment can detect the attitude/position of a reference detector 30*s* relative to the vehicle 50 during 360-degree rotation of the vehicle 50 by the change mechanism 12, detect the attitude/position of another detector 30*o* using the attitude/position of the reference detector 30*s*, and further evaluate the attitude/position detection result of the other detector 30*o*. Therefore, the attitude/position detection of detectors 30 disposed at the front, at the rear, at the left, and at the right of the vehicle 50 can be performed, in a limited space, simply by rotating the vehicle 50 relative to the targets TG.

Figure 8:
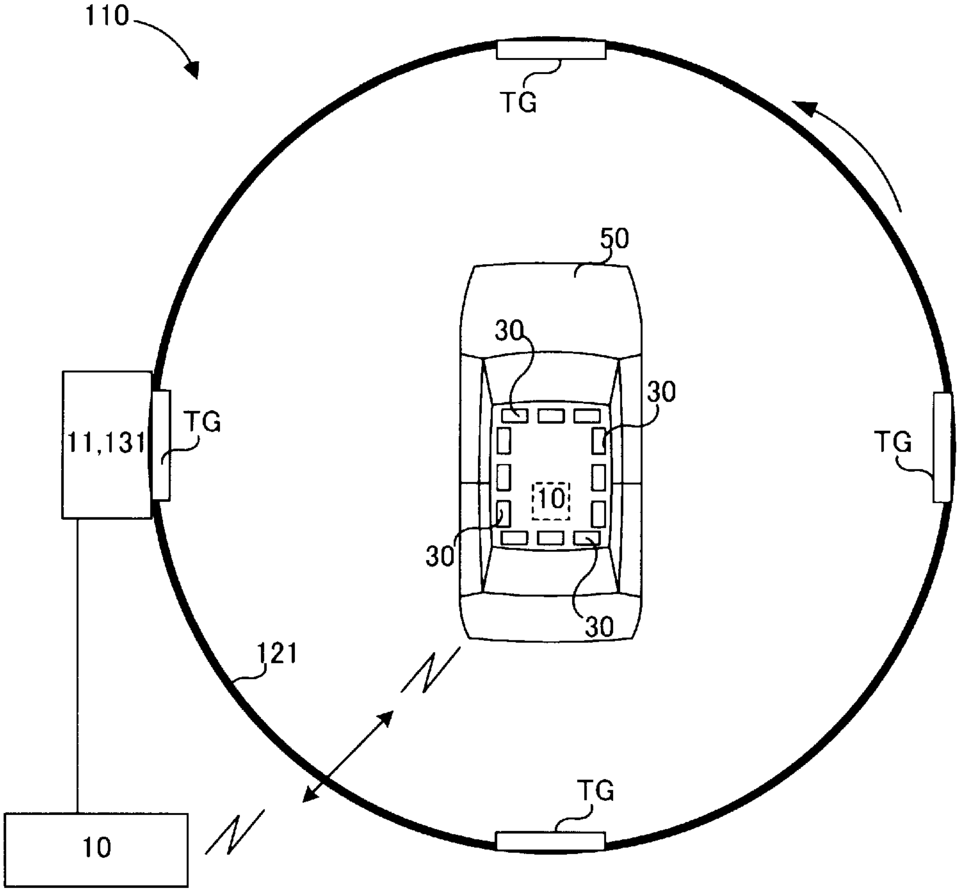
FIG. 8 is a schematic diagram of a detector attitude/position detection system according to a modification to the first embodiment.

In the detector attitude/position detection system 100 of the first embodiment, a turntable that rotates the vehicle 50 is used as the change mechanism. Alternatively, as illustrated in FIG. 8, a target rotating device that rotates the targets TG around the vehicle 50 may be used as a change mechanism 121. The target rotating device 121 is driven by the change mechanism actuator 11, and a rotation angle is detected by a position sensor 131. In the detector attitude/position detection system 110 illustrated in FIG. 8, the change mechanism 121 is an annular or tubular frame suspended from the ceiling, and the targets TG may be suspended from the annular frame, or the targets TG may be mounted to the annular frame. The frame may be elliptically shaped rather than circular, and the distance between the vehicle 50 and each target TG may be constant or different. The change mechanism 121 may also be configured such that targets TG are suspended from a moving object, such as a wire or chain that is encased in a track that is suspended from the ceiling. In this case, the distance between the vehicle 50 and each target TG may be set to any distance by making the rail irregularly shaped. Using a plurality of targets TG at different distances from the vehicle 50 can discretize the detection data from the detectors 30 and improve the reliability of the detector attitude/position detection accuracy. Furthermore, the change mechanism 121 may be configured such that targets TG are placed on a wheel platform that moves on a track on the ground. In the attitude/position detection system 110, furthermore, a stationary attitude/position detection device 10 may acquire detection data from the vehicle 50 via wireless communications. The attitude/position detection device 10 may also be provided in the vehicle 50, in which case the attitude/position detection device 10 may be provided as part of the vehicle control unit 55 or the data processing unit 40, or as a separate device. In cases where the attitude/position detection device 10 is provided in the vehicle 50, the attitude/position detection process may be performed autonomously by the vehicle 50 with autonomous driving capability.

In the detector attitude/position detection system 100 of the first embodiment, an attitude/position relative to the vehicle 50 is determined only for the reference detectors 30*s*, and an attitude/position of each of the other detectors 30*o* may be determined using attitude/position detection results of the reference detectors 30*s*. Alternatively, for each of all the detectors 30, an attitude/position of the detector relative to the vehicle 50 may be detected. In this case, only the second region AR2 and the third region AR3 illustrated in FIG. 7 may be used. In the detector attitude/position detection system 100 of the first embodiment, the attitude/position of each detector 30 is detected using 360-degree rotation of the vehicle. Alternatively, each of the regions AR1 to AR3 may be partitioned into a range of 0 to 180 degrees or 270 degrees. In particular, in a case where the first region AR1 is not used, the angular range allocated to the first region AR1 may be deleted. The time required for the detector attitude/position detection process may be reduced by reducing the area in which the detectors 30 are disposed and thereby reducing a relative rotation area between the vehicle 50 and targets TG.

In the detector attitude/position detection system 100 of the first embodiment, the attitude/position of each detector 30 is only detected. Alternatively, calibration or aiming may be performed for each detector 30 using the attitude/position stored in the detected attitude/position information storage area 102*b*. Calibration or aiming may be performed during shipment of the vehicle 50 from the factory, during repairs that involve detector removal or frame modification, and during inter-operation inspections of commercial vehicles. Calibration or aiming may be performed in hardware, for example, by physically correcting the orientation of each detector 30 so as to compensate the detected amount of attitude/position deviation from the desired detector attitude/position, specifically, directional deviations in the horizontal and vertical directions. Alternatively, calibration or aiming may be performed in software, for example, by correcting coordinate information in the detection data acquired from each detector 30. When performed in software, the attitude/position detection device 10 may input correction information to a detection data generation unit provided in each detector 30, and each detector 30 may output detection data on which the calibration or aiming process was performed. Alternatively, the attitude/position detection device 10 may input correction information to the data processing unit 40, and the data processing unit 40 may perform the calibration or aiming process on the detection data output from each detector 30 and then output the processed detection data to the vehicle control unit 55. Furthermore, the correction information may be input from the attitude/position detection device 10 to the vehicle control device 55, and the vehicle control device 55 may perform a calibration or aiming process on the detection data output from each detector 30, and then use the detection data for various processes. These embodiments may be implemented in any one of cases where the attitude/position detection device 10 is installed in the vehicle and where the attitude/position detection device 10 is not installed in the vehicle.

Figure 9:
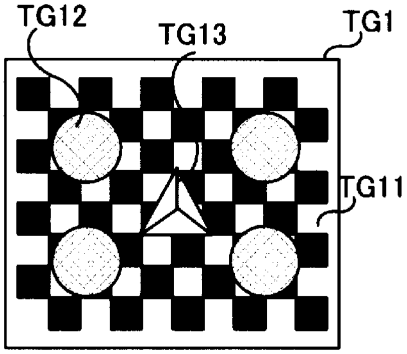
FIG. 9 is an illustration of an example of a composite target.
Figure 10:
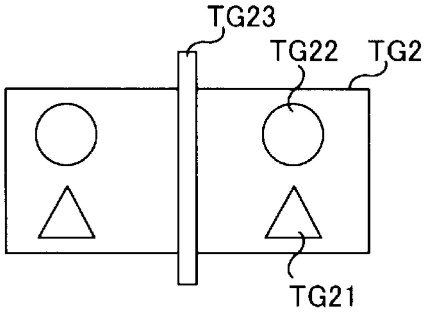
FIG. 10 is an illustration of an example of a composite target.
Figure 11:
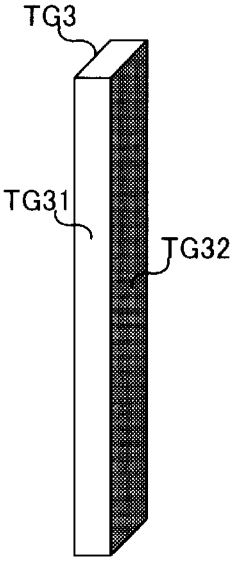
FIG. 11 is an illustration of an example of a composite target.

In the detector attitude/position detection system 100 of the first embodiment, the targets TGC, TGL, and TGM are dedicated to the camera, Lidar, and millimeter wave radar, respectively. Alternatively, as illustrated in FIGS. 9 to 11, a single target may be used for the plurality of detection schemes. The composite target TG1 illustrated in FIG. 9 includes a checkered target section TG11 for the camera, a target section TG12 with a reflector function for the Lidar, and a target section TG13 formed as a metal triangular pyramid for the millimeter-wave radar. The composite target TG2 illustrated in FIG. 10 includes target sections TG21, 22 formed as apertures for the camera and Lidar, and a target section TG23 formed as a metal pole for the millimeter-wave radar. Similarly, to the target TGH illustrated in FIG. 7, the composite target TG3 illustrated in FIG. 11 functions as a target for the camera and the Lidar and has a rectangular shape with white sides TG31 and black sides TG32. The white and black sides TG31 and TG32 are adjacent to each other, which facilitates edge detection and improves the accuracy of feature point extraction.

Second Embodiment

The detector attitude/position detection system of the second embodiment differs from the detector attitude/position detection system 100 of the first embodiment in that positions of targets TG relative to the vehicle 50, that is, the attitude/position of the vehicle 50 relative to the targets TG are dynamically detected, in that a position determination device is provided, and in that the change mechanism 12 is not provided. The detector attitude/position detection system of the second embodiment is similar in configuration to the detector attitude/position detection system of the first embodiment, except that the positions of targets TG relative to the vehicle 50 are dynamically detected upon execution of the attitude/position detection program Pr1. Therefore, in the second embodiment, the same reference numerals are assigned as in the first embodiment and description thereof will be omitted.

Figure 12:
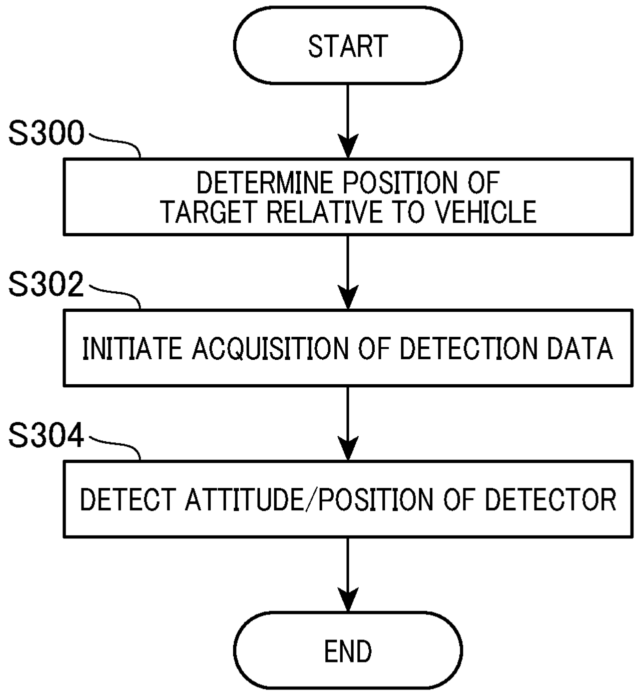
FIG. 12 is a flowchart illustrating a process flow of an attitude/position detection process performed by an attitude/position detection device according to a second embodiment.
Figure 13:
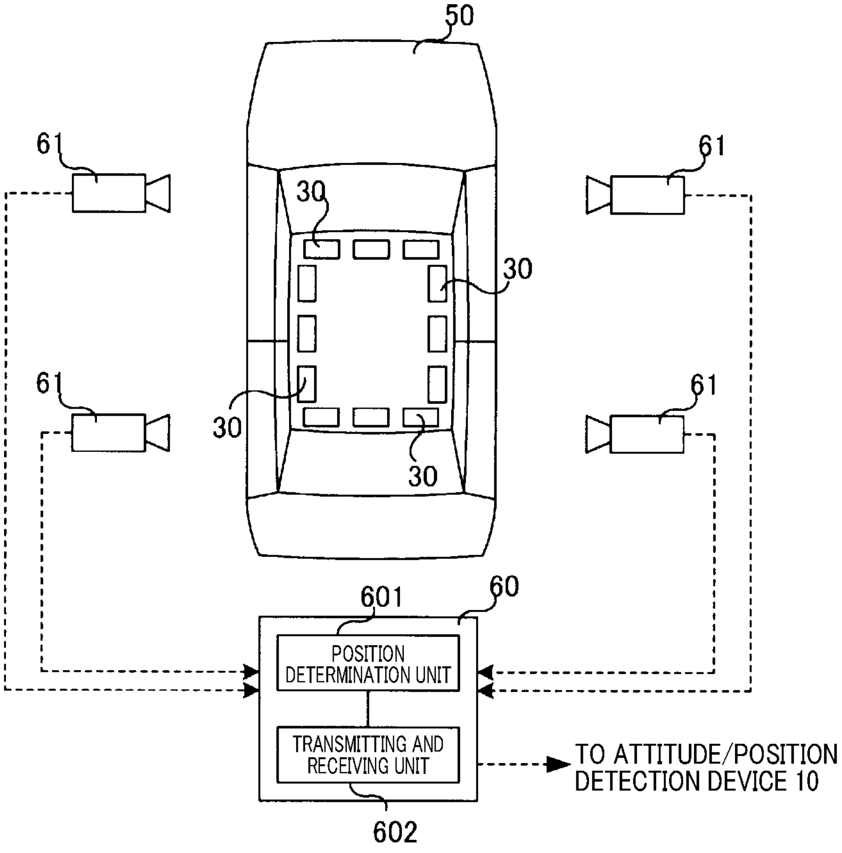
FIG. 13 is an illustration of an example of a system for detecting an attitude/position of a vehicle.

The process flow illustrated in FIG. 12 is performed by the attitude/position detection device 10, that is, the CPU 101, executing the attitude/position detection program Pr1. The process flow illustrated in FIG. 12 may be initiated automatically or manually, for example, after the vehicle 50 is stopped at a predefined reference position in the attitude/position detection booth 200 equipped with the attitude/position detection system 100. The CPU 101 determines positions of targets TG relative to the vehicle 50, that is, acquires an attitude/position of the vehicle 50 relative to the targets TG (at step S300). Specifically, the attitude/position of the vehicle 50 is acquired according to any of the modes illustrated in FIGS. 13 to 16. In FIG. 13, the attitude/position detection system 100 includes a position determination device 60 and four position-detection cameras 61 for detecting each wheel of the vehicle 50, with two cameras on each side of the vehicle 50. A position detection Lidar may be used instead of each of the position detection cameras 61. Each of the four position detection cameras 61 is connected to the position determination device 60. The position determination device 60 includes a transmission/reception unit 602 for receiving detection data from the position determination unit 601 and the position detection cameras 61 and communicating position data and control commands with the attitude/position detection device 10. The position determination unit 601 extracts an emblem arranged at the center of the wheel from image data of each wheel acquired from each camera 61, and determines a right front wheel point, a right rear wheel point, a left front wheel point, and a left rear wheel point. The position determination unit 601 determines the attitude/position of the vehicle 50 relative to the targets using at least one of a line segment connecting the right front wheel point and the left front wheel point, a line segment connecting the right rear wheel point and the left rear wheel point, a line segment connecting the right front wheel point and the right rear wheel point, and a line segment connecting the left front wheel point and the left rear wheel point. The tilt of the line segment connecting the emblems of the front and rear wheels is predefined, and the tilt of the vehicle in the longitudinal and lateral directions is determined using the calculated tilt of the line segment. The reference attitude/position of the vehicle 50 means the attitude/position of the vehicle 50 where the vehicle 50 is directly facing a reference target and the direction of the vehicle 50 and the reference target is a predefined direction, that is, the predefined, direction and distance of the vehicle 50 relative to the reference target. The reference target refers to one or more representative targets used to define the reference attitude/position of the vehicle 50, e.g., a target disposed in front of the vehicle 50 when the vehicle 50 moves forward and enters the attitude/position detection booth 200. Each detector 30 is mounted to the vehicle 50, and the accuracy of determining the attitude/position of each detector 30 is highest when the vehicle 50 is in a reference attitude/position relative to the reference target, and a positional deviation of the vehicle 50 relative to the target TG leads to a decrease in the accuracy of the detection result of the target by each detector 30.

Figure 14:
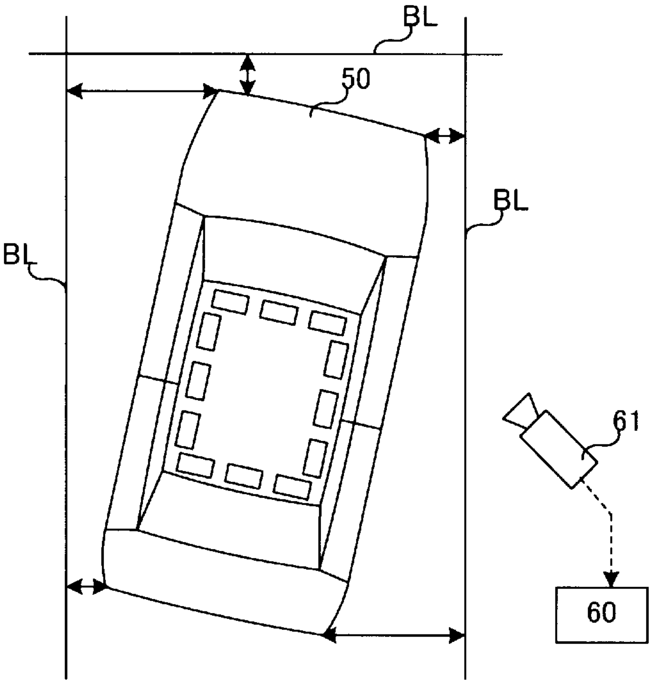
FIG. 14 is an illustration of an example of a system for detecting an attitude/position of a vehicle.

In the example illustrated in FIG. 14, the attitude/position detection system 100 includes the position determination device 60, the position detection camera 61, and guide lines BL marked on the ground to guide the vehicle to the reference attitude/position. In the example illustrated in FIG. 14, the guide lines correspond to the front, left, and right sides of the vehicle 50. The position detection camera 61 is disposed on the ceiling of the attitude/position detection booth and captures images of the vehicle 50 from above and transmits image data to the position determination device 60. The position determination device 60, that is, the position determination unit 601, determines a distance between each guide line BL and the vehicle 50, calculates a deviation from the reference attitude/position of the vehicle 50, and determines the direction of the vehicle relative to the target TG, that is, a Yaw. The distance between each guide line BL and the vehicle 50 is, for example, a distance between each guide line BL and each of the four corners located on the front, rear, left and right of the vehicle 50 and the front bumper of the vehicle 50.

Figure 15:
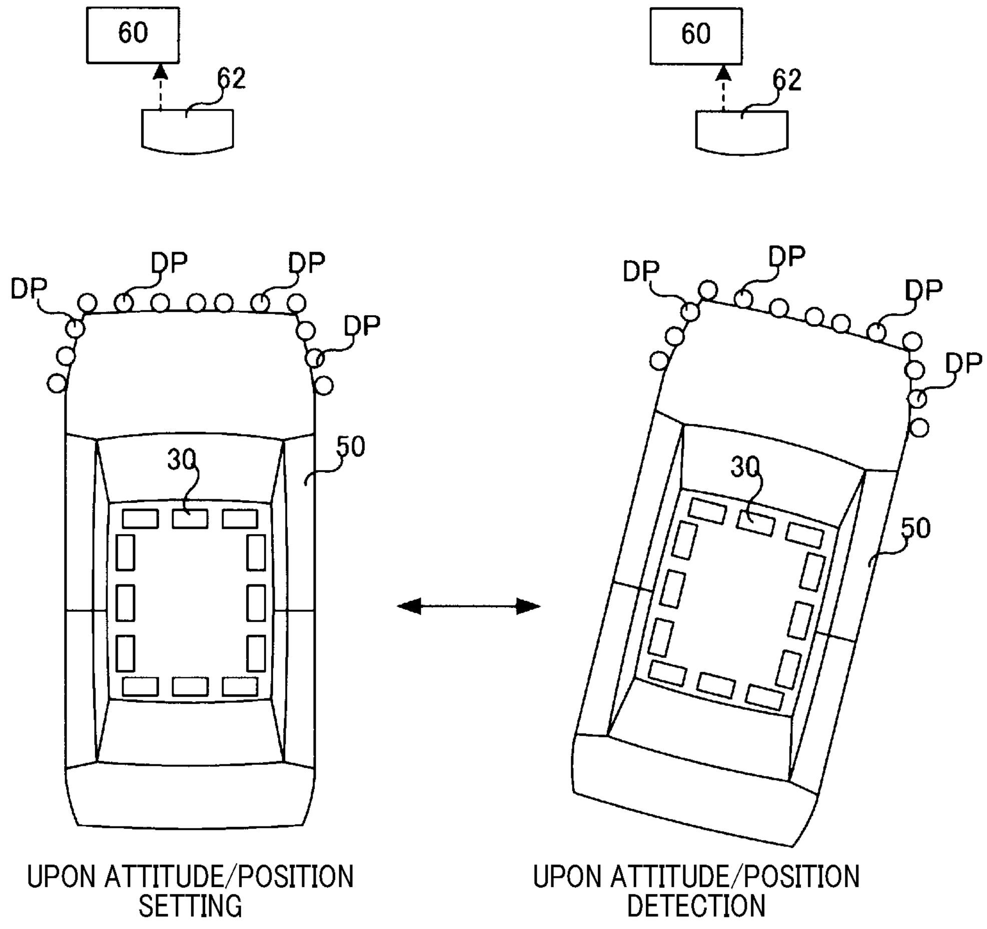
FIG. 15 is an illustration of an example of a system for detecting an attitude/position of a vehicle.

In the example illustrated in FIG. 15, the attitude/position detection system 100 includes Lidar 62 disposed in front of the vehicle 50 and connected to the position detection device 60. In the example illustrated in FIG. 15, the Lidar 62 is used to acquire detection points DP at edges of the front bumper, the front grille, or the front hood of the vehicle 50 and define an outline line formed of a group of detection points DP. The outline line acquired during the initial setup, in a state where the vehicle 50 is securely stopped such that the vehicle 50 is in the reference attitude/position, is used as a reference outline line. The position of the vehicle 50 relative to the target TG is detected by comparing the reference outline line with the outline line acquired in subsequent attitude/position detection.

Figure 16:
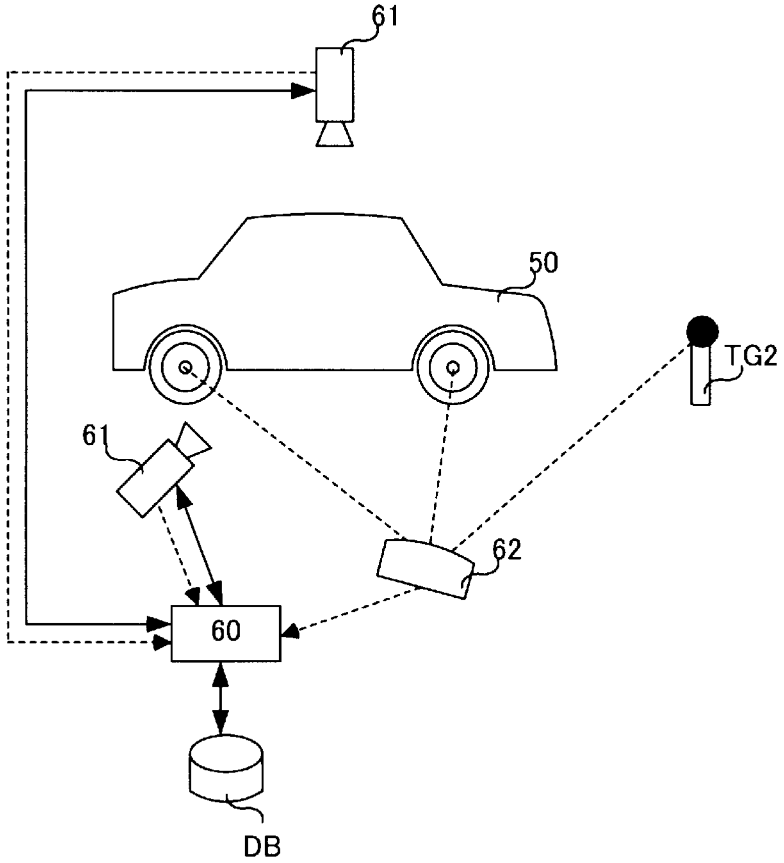
FIG. 16 is an illustration of an example of a system for detecting an attitude/position of a vehicle.

In the example illustrated in FIG. 16, the attitude/position detection system 100 includes the position determination device 60, the position detection camera 61 disposed above the vehicle 50 to capture a planar attitude/position of the vehicle 50, the position detection cameras 61 disposed to the left or right of the vehicle 50 to capture a vertical attitude/position and a side profile, the Lidar 62 that detects the position of the vehicle 50 and the position of the reference target TG2, and a position information database DB that stores detection results. In the example illustrated in FIG. 16, during the initial setup, the position determination device 60 causes the vehicle 50 to stop at the reference attitude/position, determines the position of the vehicle 50 relative to the reference target TG2 using the Lidar 62, and images the planar attitude/position and the vertical attitude/position of the vehicle 50 using the position detection cameras 61, and stores, as reference position information, position information in association with the attitude/position, in the position information database DB. During attitude/position detection, the position determination device 60 detects the attitude/position of the vehicle 50 that entered the attitude/position detection booth, using the two position detection cameras 61, and compares the detected attitude/position of the vehicle 50 with the reference attitude/position information acquired from the position information database DB to determine the position information of the vehicle 50 subjected to attitude/position detection, that is, the attitude/position of the vehicle 50 relative to the target TG2.

The CPU 101 initiates acquisition of detection data (at step S302), performs attitude/position detection of each detector 30 (at step S304), and ends this processing routine. In the attitude/position detection system 100 of the second embodiment, where the change mechanism 12 is not provided, one or more targets TG are disposed in front of, behind, to the left of, and to the right of the vehicle 50, and detection data is acquired from each of the detectors 30 located on the front, rear, left and right of the vehicle 50. In the detector attitude/position detection of the second embodiment, the attitude/position detection scheme using the reference detectors 30*s* described in the first embodiment, or the attitude/position detection scheme using the overlapping detection regions between adjacent detectors 30 without using the reference detectors 30*s* may be used.

In accordance with the detector attitude/position detection system 100 of the second embodiment described above, the position of the target TG relative to the vehicle 50, that is, the attitude/position of the vehicle 50 relative to the target TG, is dynamically detected. This enables efficient detection of the attitude/position of each of the plurality of detectors 30 mounted to the vehicle 50. Specifically, accurate determination of the attitude/position of the vehicle 50 relative to the target TG leads to increased accuracy of attitude/position detection of the detectors 30 relative to the vehicle 50, enabling detection of the effective attitude/positions of the detectors 30. The various processes using the detection data from the detectors 30 are set under assumption that the vehicle 50 is facing the target TG, that is, the position of the target TG relative to the vehicle 50 is in a predefined relationship. Therefore, in cases where the attitude/position of the vehicle 50 relative to the target TG is significantly deviated from the reference attitude/position, the accuracy of various processes using detection data from the detectors 30 may be reduced, or erroneous processes may be performed, even if the attitude/position of the detector relative to the vehicle is appropriate. According to the second embodiment, these deficiencies can be eliminated.

In the second embodiment described above, the fixed target TG is used throughout the description. Alternatively, the attitude/position detection booth 200 illustrated in FIG. 7 may be used. In this case, the attitude/position detection booth 200 may be equipped with at least the first area AR1 in which first targets are disposed for detecting the position of the target TG relative to the vehicle 50 and the second area AR2 in which second targets are disposed for detecting the attitude/position of each detector 30. The attitude/position detection device 10 causes the vehicle 50 to face the target TG disposed in the first area AR1 and then causes the vehicle 50 to face the target TG disposed in the second area AR2.

Other Embodiments (1) The attitude/position detection process for the detectors 30 using the change mechanism 12 in the first embodiment and dynamic determination of the attitude/position of the vehicle 50 relative to the target TG in the second embodiment may be combined. That is, step of dynamically determining the attitude/position of the vehicle 50 relative to the target TG may be added before step S100 in the first embodiment. Steps S104 to S106 in the first embodiment may be performed as step S304 in the second embodiment. This can increase the effectiveness of the attitude/position detection results for the detectors 30 and can further improve the processing accuracy of the later stage process using the detection results.

(2) In each of the above embodiments, each target TG has a physical outline. Alternatively, a target projected on a wall by projection mapping may be used as a target TGC for the camera. Projected targets generated by infrared light projection mapping may be used as targets TGL for the Lidar. Generating a multipath by means of mirror surfaces disposed on the wall, thereby allowing two groups of detection points to be acquired from one target TG, and allowing one group of detection points to be detected beyond the wall surface, facilitates selection of a subject target from a plurality of targets TG.

(3) In each of the above embodiments, attitude/position detection of each of the other detectors 30*o* relative to the reference detector 30*s* is performed using the overlapping detection regions between the detectors 30. In this case, an infrared light filter may be attached to a target TG, light emitted by the Lidar may be observed by a camera, and an attitude/position detection process between the camera and the Lidar may be performed. This enables detection of a deviation of the attitude/position of the Lidar relative to the camera from the tilt of the trajectory of the Lidar emitted light at the time of scanning by the camera.

(4) In each of the above embodiments, detection of the attitude/position of each detector 30, operation control of the change mechanism 12, detection of the attitude/position of the vehicle 50 relative to the target TG are implemented by the CPU 101 executing the attitude/position detection processing program Pr1. Alternatively, they may be implemented in hardware by a pre-programmed integrated circuit or discrete circuits. The control unit and its method described in each of the above embodiments may be implemented by a dedicated computer including a processor and a memory programmed to execute one or more functions embodied by computer programs. Alternatively, the control unit and its method described in the present disclosure may be implemented by a dedicated computer including a processor formed of one or more dedicated hardware logic circuits, or may be implemented by one or more dedicated computers including a combination of a processor and a memory programmed to execute one or more functions and a processor formed of one or more dedicated hardware logic circuits. The computer programs may be stored, as instructions to be executed by a computer, in a non-transitory, tangible computer-readable storage medium.

The present disclosure has been described based on the specific embodiments and modifications. These specific embodiments and modifications are simply for facilitating the understanding of the present disclosure, and are not in any way to be construed as limiting the present disclosure. The present disclosure may variously be changed or altered without departing from its spirit and encompass equivalents thereof. For example, the technical features of the embodiments, examples or modifications corresponding to the technical features of the respective aspects described in the introductory part may be replaced or combined appropriately, in order to solve part or all of the issues described above or in order to achieve part or all of the advantageous effects described above. Any of the technical features may be omitted appropriately unless the technical feature is described as essential herein.

What is claimed is:

1. An attitude/position detection system for detecting an attitude/position of at least one detector mounted to a vehicle, comprising:

at least one target used to detect the attitude/position of the at least one detector, the at least one target comprising a plurality of targets suitable for a detection scheme of the at least one detector;

a change mechanism configured to change a position of the vehicle relative to the at least one target; and an attitude/position detection device configured to control the change mechanism to maintain the position of the vehicle relative to the at least one target for a predefined period of time, and detect the attitude/position of the at least one detector using a result of detection of the at least one target by the at least one detector, wherein the at least one detector comprises a plurality of detectors placed on the vehicle, the plurality of detectors including a reference detector, and the at least one target comprises a first target for detecting the attitude/position of the reference detector relative to the vehicle, the first target being disposed in a first region, a second target for detecting the attitude/position of another detector among the plurality of detectors using a detection result of the reference detector, the second target being disposed in a second region different from the first region, and a third target for evaluating the attitude/position of each of the plurality of detectors, the third target being disposed in a third region, the attitude/position detection device is configured to evaluate the attitude/position of each of the plurality of detectors by:

(a) storing, as a first calculation result, the attitude/position of the another detector calculated using the second target in the second region;

(b) calculating, again, the attitude/position of the another detector using the third target in the third region, and acquiring a second calculation result;

(c) calculating a difference between the first calculation result and the second calculation result, and determining whether the difference is within a predefined allowable range; and (d) when the difference exceeds the allowable range, re-executing at least a process of calculating the attitude/position in the second region.

2. The attitude/position detection system according to claim 1, wherein the change mechanism is a vehicle rotating device that includes a rotatable stage to have the vehicle placed thereon and is configured to rotate the vehicle placed on the stage relative the at least one target by rotating the stage, and the at least one target is disposed around the vehicle rotating device.

3. The attitude/position detection system according to claim 1, wherein the change mechanism is a target rotating device with the at least one target around the vehicle and is configured to rotate the at least one target relative to the vehicle.

4. The attitude/position detection system according to claim 1, further comprising a position determination device configured to detect a position of the at least one target relative to the vehicle, wherein the attitude/position detection device is configured to detect the attitude/position of the at least one detector using position information acquired from the position determination device.

5. The attitude/position detection system according to claim 1, wherein the attitude/position detection device is further configured to calibrate the at least one detector using a detected attitude/position of the at least one detector.

6. The attitude/position detection system according to claim 1, wherein the attitude/position detection device is configured to be mounted to the vehicle.

7. An attitude/position detection method for detecting an attitude/position of at least one detector mounted to a vehicle, comprising:

changing a position of at least one target relative to the vehicle, the at least one target being used to detect the attitude/position of the at least one detector relative to the vehicle and comprising a plurality of targets suitable, each for a detection scheme of a corresponding one of the at least one detector;

maintaining the position of at least one target relative to the vehicle for a predefined period of time; and detecting the attitude/position of the at least one detector using a result of detection of the at least one target by the at least one detector, wherein the at least one detector comprises a plurality of detectors placed on the vehicle, the plurality of detectors including a reference detector, and the at least one target comprises a first target for detecting the attitude/position of the reference detector relative to the vehicle, the first target being disposed in a first region, a second target for detecting the attitude/position of another detector among the plurality of detectors using a detection result of the reference detector, the second target being disposed in a second region different from the first region, and a third target for evaluating the attitude/position of each of the plurality of detectors, the third target being disposed in a third region, the evaluating the attitude/position comprising:

(a) storing, as a first calculation result, the attitude/position of the other detector calculated using the second target in the second region;

(b) calculating, again, the attitude/position of the other detector using the third target in the third region, and acquiring a second calculation result;

(c) calculating a difference between the first calculation result and the second calculation result, and determining whether the difference is within a predefined allowable range; and (d) when the difference exceeds the allowable range, re-executing at least a process of calculating the attitude/position in the second region.

8. An attitude/position detection method for detecting an attitude/position of at least one detector mounted to a vehicle, comprising:

detecting a position of the vehicle relative to a first target disposed in a first region; and detecting, by using a second target, the attitude/position of the at least one detector based on position information indicating the detected position of the vehicle relative to the first target.

9. An attitude/position detection system for detecting an attitude/position of at least one detector mounted to a vehicle, comprising:

at least one target used to detect the attitude/position of the at least one detector, the at least one target comprising a target suitable for a plurality of detection schemes of the at least one detector;

a change mechanism configured to change a position of the vehicle relative to the at least one target; and an attitude/position detection device configured to control the change mechanism to maintain the position of the vehicle relative to the at least one target for a predefined period of time, and detect the attitude/position of the at least one detector using a result of detection of the at least one target by the at least one detector, wherein the at least one detector comprises a plurality of detectors placed on the vehicle, the plurality of detectors including a reference detector, and the at least one target comprises a first target for detecting the attitude/position of the reference detector relative to the vehicle, the first target being disposed in a first region, a second target for detecting the attitude/position of another detector among the plurality of detectors using a detection result of the reference detector, the second target being disposed in a second region different from the first region, and a third target for evaluating the attitude/position of each of the plurality of detectors, the third target being disposed in a third region, the attitude/position detection device is configured to evaluate the attitude/position of each of the plurality of detectors by:

(a) storing, as a first calculation result, the attitude/position of the other detector calculated using the second target in the second region;

(b) calculating. again, the attitude/position of the other detector using the third target in the third region, and acquiring a second calculation result;

(c) calculating a difference between the first calculation result and the second calculation result, and determining whether the difference is within a predefined allowable range; and (d) when the difference exceeds the allowable range, re-executing at least a process of calculating the attitude/position in the second region.

10. The attitude/position detection system according to claim 9, wherein the change mechanism is a vehicle rotating device that includes a rotatable stage to have the vehicle placed thereon and is configured to rotate the vehicle placed on the stage relative the at least one target by rotating the stage, and the at least one target is disposed around the vehicle rotating device.

11. The attitude/position detection system according to claim 9, wherein the change mechanism is a target rotating device with the at least one target around the vehicle and is configured to rotate the at least one target relative to the vehicle.

12. The attitude/position detection system according to claim 9, further comprising a position determination device configured to detect a position of the at least one target relative to the vehicle, wherein the attitude/position detection device is configured to detect the attitude/position of the at least one detector using position information acquired from the position determination device.

13. The attitude/position detection system according to claim 9, wherein the attitude/position detection device is further configured to calibrate the at least one detector using a detected attitude/position of the at least one detector.

14. The attitude/position detection system according to claim 9, wherein the attitude/position detection device is configured to be mounted to the vehicle.

* * * * *